US008953265B1

(12) United States Patent
Ma (10) Patent No.: US 8,953,265 B1
(45) Date of Patent: Feb. 10, 2015

(54) METHOD AND SYSTEM FOR MONITORING DISK RELIABILITY WITH GLOBAL DISK SCRUBBING

(71) Applicant: EMC Corporation, Hopkinton, MA (US)

(72) Inventor: Ao Ma, Palo Alto, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/340,358

(22) Filed: Jul. 24, 2014

(51) Int. Cl.
*G11B 27/36* (2006.01)
(52) U.S. Cl.
USPC .......................................... 360/31; 369/53.42
(58) Field of Classification Search
None
See application file for complete search history.

(56) References Cited

U.S. PATENT DOCUMENTS

| 7,653,847 B1* | 1/2010 | Liikanen et al. | 714/723 |
| 7,685,360 B1* | 3/2010 | Brunnett et al. | 711/112 |
| 7,752,491 B1* | 7/2010 | Liikanen et al. | 714/6.13 |
| 7,916,421 B1* | 3/2011 | Liikanen et al. | 360/77.01 |

OTHER PUBLICATIONS

Anderson, D. , et al., "More than an interface—SCSI vs. ATA", *Proceedings of the 2nd Annual Conference on File and storage Technology (FAST)*, Mar. 2003.
Bairavasundaram, L. N., et al., "An Analysis of Data Corruption in the Storage Stack", *Proceedings of the 6th USENIX Conference on File and Storage Technologies (FAST '08)*, Feb. 2008.
Bairavasundaram, L. N., et al., "An Analysis of Latent Sector Errors in Disk Drives", *Proceedings of SIGMETRICS'07*, Jun. 2007.
Bodik, P. , et al., "Fingerprinting the Datacenter: Automated Classification of Performance Crises", In *Proceedings of EuroSys'10*, 2010.
Corbett, P. , et al., "Row-Diagonal Parity for Double Disk Failure Correction", *Proceedings of the Third USENIX Conference on File and Storage Technologies (Fast '04)*, Mar. 2004.
Elerath, J. G., et al., "Disk Drive Reliability Case Study: Dependence Upon Head Fly-Height and Quantity of Heads", *2003 Proceedings Annual Reliability and Maintainability Symposium (RAMS '03)*, Jan. 2003.
Elerath, Jon , "Hard-Disk Drives: The Good, the Bad, and the Ugly", *Communications of the ACM*, 52(6), Jun. 2009.
Elerath, J. G., et al., "Server Class Disk Drives: How Reliable Are They?", *2004 Proceedings Annual Reliability and Maintainability Symposium (RAMS '04)*, Jan. 2004.
Goldszmidt, Moises , "Finding soon-to-fail disks in a haystack", In *Workshop on Hot Topics in Storage and file Systems (HotStorage '12)*, Jun. 2012.

(Continued)

*Primary Examiner* — Paul Huber
(74) *Attorney, Agent, or Firm* — Blakely, Sokoloff, Taylor & Zafman LLP (57) ABSTRACT

Techniques for disk scrubbing are described herein. According to one embodiment, for each of the sectors of a storage disk, a read operation is issued to a sector of a first storage disk of a storage system. In response to an error returned from the read operation, it is determined whether the sector is a live sector, first data is generated as random data if the sector is not a live sector, and the first data is written to the sector to trigger a remap process that remaps a logical block address associated with the sector to another physical block address. The remap process increments the reallocated sector count. It is determined whether the first storage disk is vulnerable based on a number of reallocated sectors resulted from the first storage disk based on the remap process, which is performed by internal logic of the first storage disk.

21 Claims, 6 Drawing Sheets

(56) References Cited

OTHER PUBLICATIONS

Gray, J., et al., "Empirical Measurements of Disk Failure Rates and Error Rates", *Microsoft Research Technical Report MSR-TR-2005-166*, Dec. 2005.

Hamerly, G., et al., "Bayesian approaches to failure prediction for disk drives", *Proceedings of the Eighteenth International Conference on Machine Learning (ICML '01)*, 2001.

Hughes, G. F., et al., "Improved Disk-Drive Failure Warnings", *IEEE Transactions on Reliability*, 51(3), Sep. 2002.

Kari, Hannu H., "Latent Sector Faults and Reliability of Disk Arrays", *PhD Thesis Helsinki University of Technology*, Sep. 1997.

Krioukov, A., et al., "Parity Lost and Parity Regained", In *Proceedings of the 6th USENIX Conference on File and Storage Technologies (FAST '08)*, Feb. 2008.

Lancaster, L., et al., "Measuring Real World Data Availability", In *Proceedings of the LISA 2001 15th Systems Administration Conference*, Dec. 2001.

Murray, J. F., et al., "Hard drive failure prediction using non-parametric statistical methods", *Proceedings ICANN/ICONIP* 2003.

Murray, J. F., et al., "Machine Learning Methods for Predicting Failures in Hard Drives: A Multiple-Instance Application", *Journal of Machine Learning Research*, vol. 6, 2005.

Patterson, D., et al., "A Case for Redundant Arrays of Inexpensive Disks (RAID)", *Proceedings of the 1988 ACM SIGMOD International Conference on Management of Data (SIGMOD '88)*, Jun. 1988.

Pinheiro, E., et al., "Failure Trends in a Large Disk Drive Population", *Proceedings of the 5th USENIX Conference on File and Storage Technologies (FAST '07)*, Feb. 2007.

Prabhakaran, V., et al., "IRON File Systems", In *Proceedings of the 20th ACM Symposium on Operating Systems Principles (SOSP '05)*, Oct. 2005.

Schroeder, B., et al., "Disk failures in the real world: What does and MTTF on 1,000,000 hours mean to you?", In *Proceedings of the 5th USENIX Conference on File and Storage Technologies (FAST '07)*, Feb. 2007.

Schroeder, B., et al., "Understanding latent sector errors and how to protect against them", In *Proceedings of the 8th USENIX Conference on File and Storage Technologies (FAST '07)*, Feb. 2010.

Schwarz, T., "Disk Failure Investigations at the Internet Archive", *NASA/IEEE Conference on Mass Storage Systems and Technologies (MSST 2005)*, May 2006.

Schwarz, T. J., et al., "Disk Scrubbing in Large Archival Storage Sysems", *Proceedings of the 12th IEEE/ACM International Symposium on Modeling, Analysis, and Simulation of Computer and Telecommication Systems (MASCOTS 2004)*, Oct. 2004.

Shah, S., et al., "Reliability Analysis of Disk Drive Failure Mechanisms", *2005 Proceedings Annual Reliability and Maintainability Symposium (RAMS '05)*, Jan. 2005.

Talagala, N., et al., "An Analysis of Error Behavior in a Large Storage System", *University of California, Berkeley, Computer Science Division, Report No. UCB/CSD-99-1042*, Feb. 1999.

Wallace, G., et al., "Characteristics of Backup Workloads in Production Systems", In *Proceedings of the 10th USENIX Conference on File and Storage Technologies (FAST '12)*, Feb. 2012.

\* cited by examiner

METHOD AND SYSTEM FOR MONITORING DISK RELIABILITY WITH GLOBAL DISK SCRUBBING

FIELD OF THE INVENTION

Embodiments of the present invention relate generally to data storage systems. More particularly, embodiments of the invention relate to monitoring disk reliability with global disk scrubbing.

BACKGROUND

Data storage utilization is continually increasing, causing the proliferation of storage systems in data centers. Hard disk drives are the primary storage media in enterprise environments. Despite the central role hard disks in storing precious data, they are among the most vulnerable hardware components in a computer system. Monitoring and managing these systems require increasing amounts of human resources. Information technology (IT) organizations often operate reactively, taking action only when systems reach capacity or fail, at which point performance degradation or failure has already occurred. Hard disk failures fall into one of two basic classes: predictable failures and unpredictable failures. Predictable failures result from slow processes such as mechanical wear and gradual degradation of storage surfaces. Monitoring can determine when such failures are becoming more likely. Unpredictable failures happen suddenly and without warning. They range from electronic components becoming defective to a sudden mechanical failure (perhaps due to improper handling). However, a disk failure may not follow a simple fall-stop model. The fault model presented by modern disk drivers is much more complex. Amongst all the different types of errors, whole-disk failures and sector errors are the major faults that affect data safety.

Figure 1:
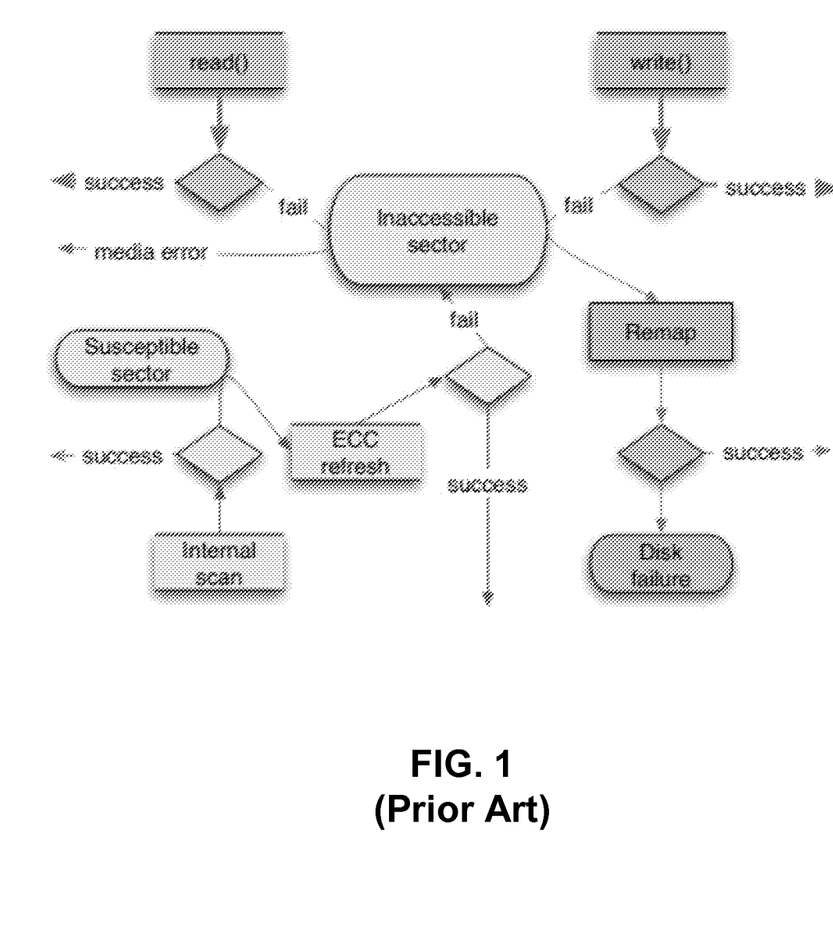
FIG. 1 is a block diagram illustrating a conventional disk scrubbing process.

One of the errors is the medium error. This error occurs when a particular disk sector cannot be read. Any data previously stored in the sector is lost. The disk interface reports the status code upon detecting a sector error, specifying the reason why the read command failed. Sector-level errors can occur even when a sector has not been accessed for some time. Therefore, modern disk drives usually include an internal scan process, as shown in FIG. 1, which scans and checks sector reliability and accessibility in the background. Unstable sectors detected in the process will be marked as pending sectors, and disk drives can try rectifying these errors through internal protection mechanisms, such as built-in error correction codes and refreshment, which rewrites sector with the data read from that track to recover the faded data. Any sectors that are not successfully recovered will be marked as uncorrectable sectors. After a number of unsuccessful retries, disk drives automatically re-map a failed write to a spare sector. More precisely, a logical block address (LBA) is reassigned from the failed sector to a spare sector and the content is written to the new physical location. Modern disk drives usually reserve a few thousand spare sectors, which are not initially mapped to particular LBAs. Re-mapping can only occur on detected write errors.

Conventionally, disk scrubbing aims to verify data accessibility and proactively detect lost data on failed sectors which can be recovered through redundant array of independent disks (RAID) redundancy. Thus, it only scans live sectors (e.g., those storing data accessible through a file system), which may not be sufficient enough to detect a vulnerable disk. A vulnerable disk refers to a disk that is likely to fail in the near future or is probably to have bursts of sector errors.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Based on the researches, the number of reallocated sectors are highly correlated with whole-disk failures as well as bursts of sector errors. Thus, the number of remapped sectors can be used to reflect or represent the health status of each disk and is a good criteria to identify unstable disks. According to some embodiments, recognizing all latent sector errors timely is valuable to monitor disk status. Periodically checking all disk sectors (e.g., including live or active sectors and not-alive or inactive sectors) becomes indispensable to track the disk reliability deterioration. In one embodiment, the disk scrubbing process scans all sectors of the disk periodically to timely detect inaccessible sectors through read operations (or small computer system interface (SCSI) verify commands). Once the scan process detects a failed sector, according to one embodiment, it writes data which are generated randomly to the failed sector to trigger the disk internal remapping process. Every failed sector detected through reads or verifications will eventually lead to a remapped sector. Therefore, the reallocated sector count is actually the number of inaccessible sectors detected in read and write, which reflects the accurate reliability of each disk and can be used to identify unstable disks.

Figure 2:
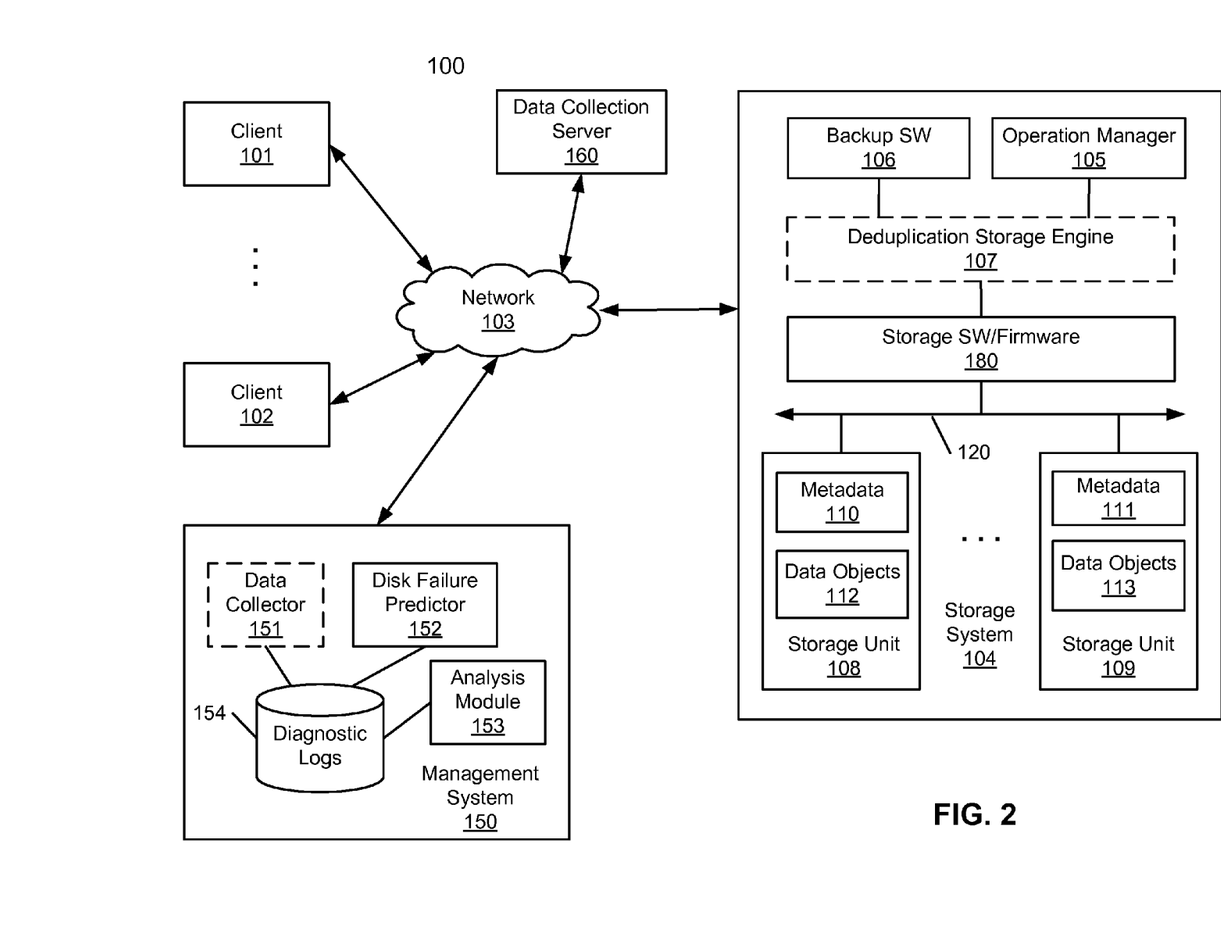
FIG. 2 is a block diagram illustrating a storage system according to one embodiment of the invention.

FIG. 2 is a block diagram illustrating a storage system according to one embodiment of the invention. Referring to FIG. 2, system 100 includes, but is not limited to, one or more client systems 101-102 communicatively coupled to one or more storage systems 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, or a combination thereof, wired or wireless.

Storage system 104 may include any type of server or cluster of servers. For example, storage system 104 may be a storage server used for any of various different purposes, such as to provide multiple users with access to shared data and/or to back up mission critical data. In one embodiment, storage system 104 includes, but is not limited to, backup engine 106, optional deduplication storage engine 107, storage software or firmware 180, and one or more storage units 108-109 communicatively coupled to each other. Storage units 108-109 may be implemented locally (e.g., single node operating environment) or remotely (e.g., multi-node operating environment) via interconnect 120, which may be a bus and/or a network.

In response to a data file to be stored in storage units 108-109, deduplication storage engine 107 is configured to segment the data file into multiple chunks (also referred to as segments) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

According to one embodiment, storage system 104 further includes an operation manager 105 to manage and monitor operations performed by storage system 104, including periodically collecting, for example, via storage software/firmware 180, and transmitting operating diagnostic data of storage units 108-109 (e.g., reallocated sector counts) to a remote device such as management system 150 over network 103. In this example as shown in FIG. 2, storage system 104 may be located at a client site and utilized by a client such as an enterprise or corporation, where the storage system 104 may be provided by a storage provider or vendor such as EMC® Corporation. In one embodiment, operation manager 105 periodically collects operating statistics concerning operations of storage units 108-109 and transmits diagnostic data representing at least some of the operating statistics to management system 150, where management system 150 is associated with a storage provider or vendor that provides storage system 104 to a client.

For example, management system 150 may be operated or owned by the storage provider or alternatively, it may be operated by a third-party vendor on behalf of the storage provider. In one embodiment, the diagnostic data may include diagnostic parameters such as those defined by S.M.A.R.T. specification and/or those defined as part of the SCSI disk return codes, which may be collected from the storage system 104. For example, operation manager 105 may include or communicate with an S.M.A.R.T. tool or software configured to monitor operations of storage units 108-109. Each of the storage units 108-109 may be implemented one or more individual disks or alternatively, a RAID array of disks.

Self-Monitoring, Analysis and Reporting Technology (S.M.A.R.T., or simply written as SMART) is a monitoring system for computer hard disk drives to detect and report on various indicators of reliability, in the hope of anticipating failures. When a failure is anticipated by S.M.A.R.T., the user may choose to replace the drive to avoid unexpected outage and data loss. The manufacturer may be able to use the S.M.A.R.T. data to discover where faults lie and prevent them from recurring in future drive designs.

Note that storage system 104 may represent a group or cluster of individual storage systems, where operation manager 105 of each storage system may be equipped with a "phone-home" functionality that may periodically transmit operating status of the respective storage system, including the diagnostic parameters (e.g., S.M.A.R.T. attributes and SCSI return codes) of the associated storage disks, to a centralized or distributed entity, such as management server 150 or dedicated data collection entity 160 (e.g., a third-party data collection agent).

According to one embodiment, management system 150 includes a data collector 151, disk failure predictor 152, and analysis module 153. Data collector 151 is employed to communicate with operation manager 105 of storage system(s) 104 to collect diagnostic data concerning operating statuses of storage units 108-109, as well as storage system 104 in general. Note that although one storage system is shown in FIG. 2, data collector 151 may communicate with multiple operation managers of multiple storage systems to collect diagnostic data concerning the respective storage systems, which may be located at the same or different geographical locations (e.g., same or different client sites). For example, management system 150 may be a centralized management server or cluster of servers (e.g., in the cloud) for single or multiple clients or customers.

The collected diagnostic data is stored in a storage device as part of diagnostic logs 154. In one embodiment, diagnostic data 154 includes diagnostic parameters collected from various storage systems such as storage system 104. The diagnostic parameters may be those attributes (e.g., reallocated sector, pending sector, uncorrectable sector, etc.) defined by S.M.A.R.T. Alternatively, diagnostic parameters may be those from the SCSI return codes (e.g., medium error, timeout, connection error, data error, etc.). In one embodiment, analysis module 153 is to perform an analysis on the diagnostic data 154 such as determining which of the diagnostic parameters can be used as the best disk failure indicator(s). Disk failure predictor 152 is configured to predict, using the disk failure indicator(s), which one or more of the disks of storage units 108-109 of storage system 104 have a higher probability of disk failures.

As described in the co-pending U.S. patent application Ser. No. 14/162,409, filed Jan. 23, 2014 (which is incorporated by reference herein in its entirety), among other storage parameters, a reallocated sector count (also referred to as a remapped sector count) is a good metric or indicator indicating whether a particular disk is soon-to fail or is likely to have bursts of sector errors. In one embodiment, storage software/firmware 180 includes disk scrub logic that is configured to scan or scrub all sectors of each of disks associated with storage units 108-109 to detect the vulnerability of the disks. Unlike a conventional disk scrubbing process, which only scans the live sectors of the disks, the disk scrubbing logic of storage software/firmware 180 is configured to scan all sectors, including the live sectors (also referred to as in-use sectors) and non-live sectors (also referred to as non-in-use sectors).

According to one embodiment, the disk scrubbing logic scans each of the sectors of each disk by reading each sector. If an error, such as a medium error, is returned in response to the read operation indicating that the sector may be a failed sector, the disk scrubbing logic is to write data to the sector. According to the standard specification of a storage disk, when data is written to a failed sector, the write operation may trigger a sector remap process. The remap process may stores the data to be written to a new unallocated (presumably working sector) and remap the corresponding logical block address (LBA) to a physical block address (PBA) corresponding to the newly allocated sector.

In one embodiment, if the failed sector is a live sector containing live data that is accessible via the file system, the disk scrubbing logic may attempt to recover the data from other redundant data. For example, if the disk in question is one of the RAID disks, the disk scrubbing logic may recover the data from other RAID disks and write the recovered data back to the failed sector, which triggers the remap process, where the recovered data may be written to a remapped sector. If the failed sector is not a live sector, the disk scrubbing logic may generate random data and write the random data back to the failed sector to trigger the remap process.

As described above, the disk scrubbing process may cause some of the sectors to be remapped (e.g., reallocated). The remapped sector counts of the disks 108-109 may be maintained by a S.M.A.R.T. table within the disks. Subsequently, operation manager 105 can retrieve the reallocated sector count from disks 108-109 and transmit the reallocated sector counts to management system 150 and/or data collection server 160. Based on the reallocated sector counts collected from storage system 104, analysis module can perform an analysis on the collected data and generate certain predictive models. The predictive models can be used by disk failure predictor 152 to determine a failure probability, representing whether a particular disk is vulnerable based on the reallocated sector count associated with that particular disk. In a RAID environment, based on the failure probabilities of individual disks, disk failure predictor can determine a failure probability of multiple ones of the RAID disks.

Figure 3:
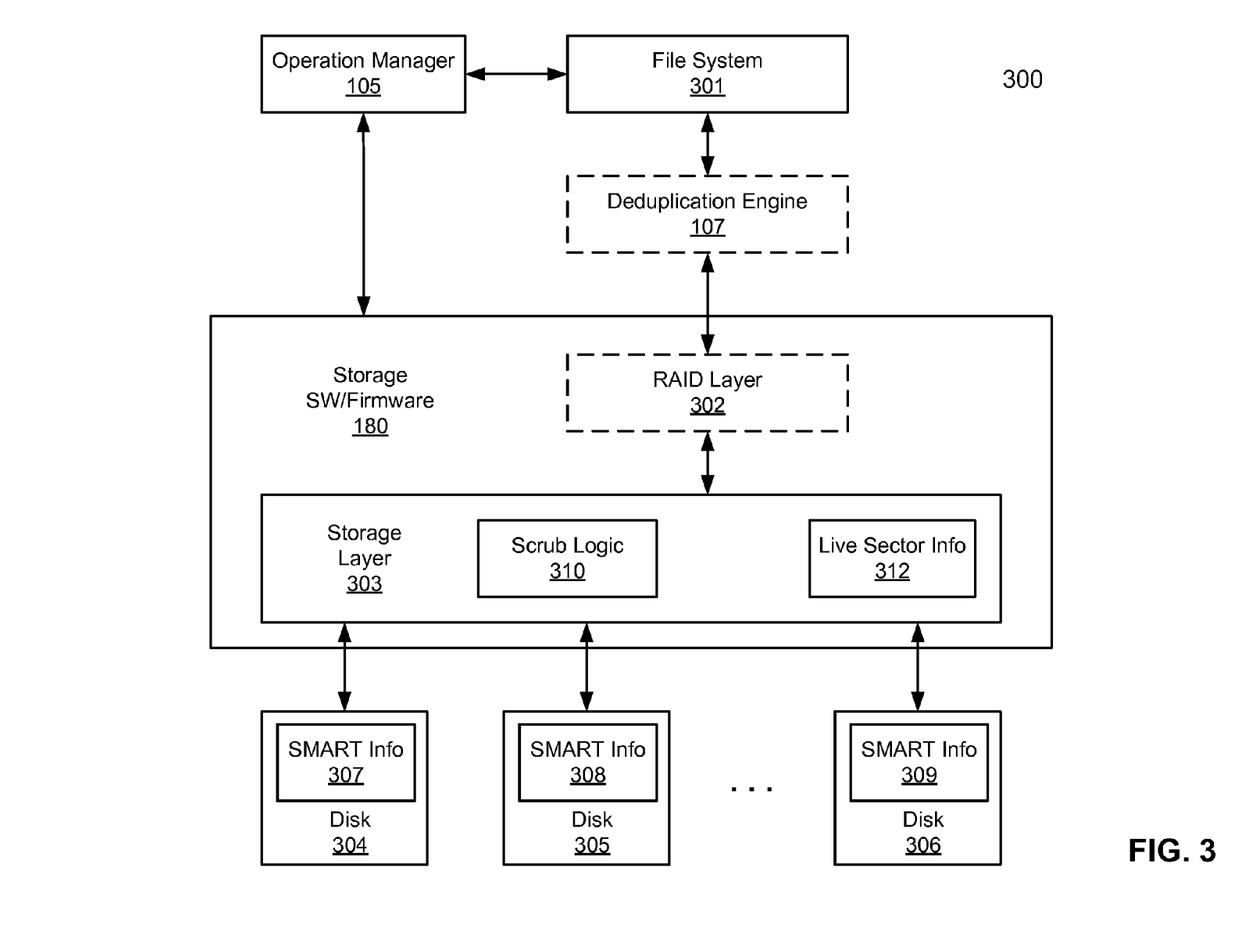
FIG. 3 is a block diagram illustrating a storage system according to one embodiment of the invention.

FIG. 3 is a block diagram illustrating a storage system according to one embodiment of the invention. System 300 may be implemented as part of system 100 of FIG. 2. Referring to FIG. 3, system 300 includes, but is not limited to, operation manager 105 communicatively coupled to file system 301, which communicates with storage software/firmware 180 via optional deduplication engine 107. Operation manager 105 may also communicate with storage software/firmware 180. File system 301 provides a file system interface to a variety of clients, such as backup software 106 and operation manager 105. File system 301 processes client requests by sending read and write operations to storage software/firmware 180, which in turn communicates with disks 304-306. Disks 304-306 may represent storage units 108-109 of FIG. 2.

In a RAID environment, disks 304-306 may represent RAID disks providing redundant protection with each other. Storage software/firmware 180 may further include RAID layer 302 and storage layer 303. Each of disks 304-306 maintains SMART information 307-309, respectively. The SMART information may be queried and retrieved via a SMART interface (not shown). For example, operation manager 105 can retrieve a reallocated sector count from each of disks 304-306. In this example, RAID layer 302 transforms the requests received from file system 301 into disk logical block requests and passes the disk logical block requests to storage layer 303 to access the corresponding physical blocks in any of disks 304-306. RAID layer 302 may include functionalities that are compatible with RAID-6 specification, which provide redundant protection for up to two simultaneous disk failures.

In one embodiment, storage layer 303 includes disk scrubbing logic 310 and live sector information 312. Disk scrubbing logic 310 is to perform a disk scrubbing process on disks 304-306. Live sector information 312 stores information indicating which of the sectors are alive and accessible via file system 301, which may be implemented using a variety of data structures (e.g., bitmaps). In one embodiment, disk scrubbing logic 310 is configured to scan all sectors of each of disks 304-306 by reading from each sector. If there is an error returned in response to the read operation, disk scrubbing logic 310 writes certain data back to the failed sector to trigger a sector remap or reallocation process performed by internal logic of disks 304-306. The SMART information (e.g., SMART information 307-309) of the corresponding disk may be updated to reflect the reallocated sector count. Subsequently, operation manager 105 can retrieve the reallocated sector counts from disks 304-306 and transmit the reallocated sector counts to management server 150 to determine the vulnerability of disks 304-306.

Figure 4:
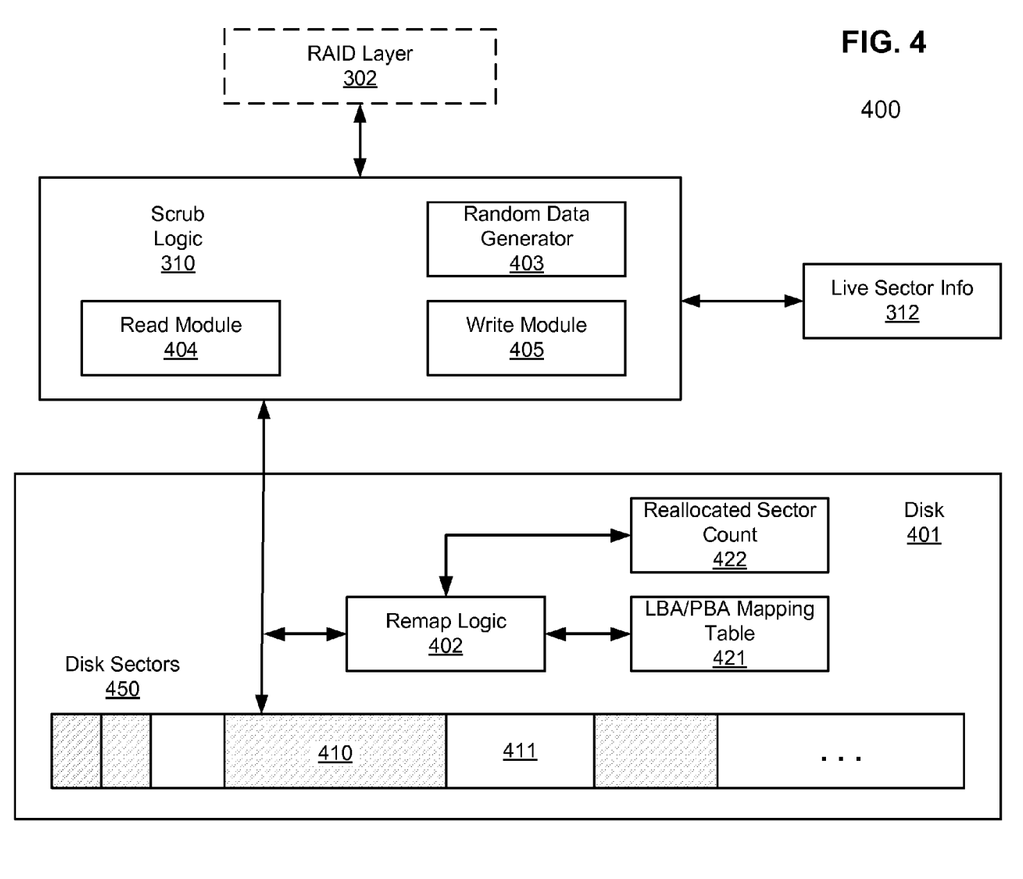
FIG. 4 is a block diagram illustrating a disk scrubbing mechanism of a storage system according to one embodiment of the invention.

FIG. 4 is a block diagram illustrating a disk scrubbing mechanism of a storage system according to one embodiment of the invention. System 400 may be implemented as part of system 300 of FIG. 3. Referring to FIG. 4, disk scrubbing logic 310 includes random data generator 403, read module 404, and write module 405, all of which may be implemented in software, hardware, or a combination thereof. Referring to FIG. 4, disk scrubbing logic 310 is configured to periodically scrub all sectors 450 of disk 401, including the live or in-used sectors (e.g., sector(s) 410 in shadow) and non-live or not-in-used sectors (e.g., sector(s) 411), where disk 401 may represent any of disks or storage units 304-306 of FIG. 3.

According to one embodiment, for each sector, read module 404 is to read from the sector and examine the return status. As described above, if there is an error in the read operation, such as a medium error, write module 405 is to write some data back to the sector. Since the sector returns an error, it is considered as a failed sector. Any write to a failed sector will trigger a remap process as part of a storage standard or specification. The remap process may be performed by remap logic 402, as a part of internal logic of disk 401, to identify and allocate a new sector represented by a new PBA. Remap logic 402 will remap a LBA associated with an existing PBA representing the failed sector to a new PBA corresponding to the newly allocated sector in LBA/PBA mapping table 421. Meanwhile, the remap process causes the reallocated (or remapped) sector count 422 of disk 401 to be incremented as a part of SMART attributes associated with disk 401. The disk scrubbing logic 310 performs the above operations iteratively for each of the sectors in disk 401. At the end, the total reallocated sector count 422 may be utilized to represent whether disk 401 is vulnerable. For example, if the total reallocated sector count 422 is greater than a predetermined threshold, disk 401 may be considered vulnerable. The threshold may be user configurable dependent upon the specific configuration or deployment of disk 401.

According to another embodiment, if disk 401 is one of RAID disks, when a live sector is detected as a failed sector, the data originally stored in the failed sector may be recovered using other RAID disks. For example, when read module 404 reads from sector 410 and receive an error in turn, write module 405 may determine based on live sector information 312 whether sector 410 is a live or in-used sector. Live sector information 312 may be maintained using a variety of data structure, such as, for example, a bitmap, in which each bit corresponds to one of the sectors in disk 401. A bit having a predetermined logical value (e.g., TRUE) may indicate that the corresponding sector is alive and accessible via the file system.

If sector 410 is determined to be a live sector, write module 405 communicates with RAID layer 302 to recover the data originally stored in failed sector 410. Write module 405 then writes the recovered data back to the failed sector 401, which triggers the remap process performed by remap logic 402 as described above. If sector 410 is not a live sector, random data generator 403 is invoked to generate random data and the random data is written by write module 405 back to failed sector 410, which triggers the remap process performed by remap logic 402 as described above. As a result, all sectors of disk 401 are examined and generate a reallocated sector count that accurately represents the vulnerability of disk 401.

Figure 5:
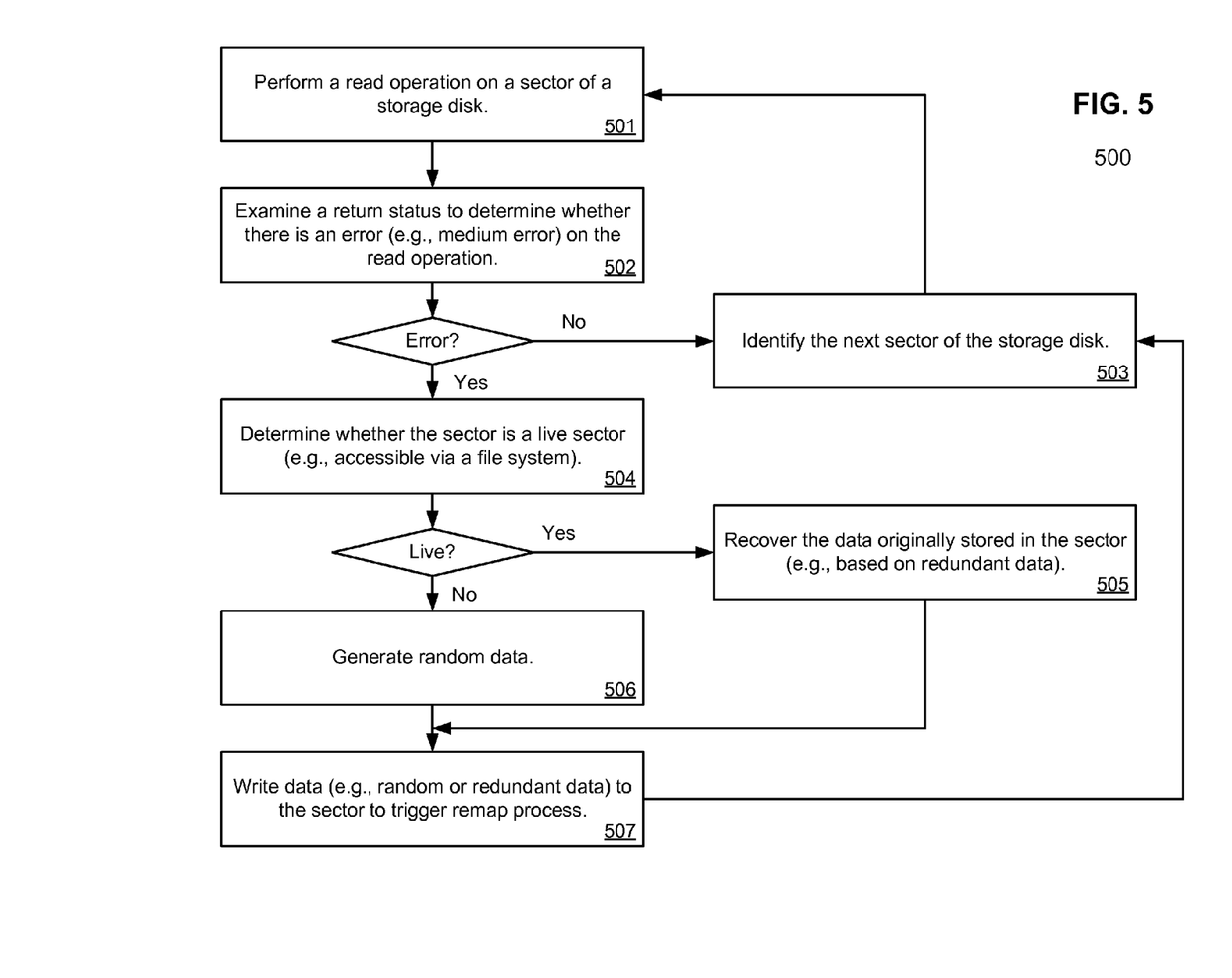
FIG. 5 is a flow diagram illustrating a process for determining vulnerability of a disk according one embodiment of the invention.

FIG. 5 is a flow diagram illustrating a process for determining vulnerability of a disk according one embodiment of the invention. Process 500 may be performed by processing logic which may include software, hardware, or a combination thereof. For example, process 500 may be performed by system 400 of FIG. 4. Referring to FIG. 5, at block 501, processing logic performs a read operation on a sector of a disk. At block 502, a return status is examined to determine whether an error (e.g., a medium error) occurs. If there is no error occurred, at block 503, a next sector of the disk is identified and the process is repeatedly performed. If an error occurs, at block 504, processing logic determines whether the sector is a live sector (e.g., accessible via the file system). If the sector is a live sector, at block 505, processing logic recovers the data from the associated redundant data (e.g., from other RAID disks). If the sector is not a live sector, at block 506, random data is generated. Note that operations involved in blocks 504-505 are performed only if there is redundant data available for the disk (e.g., the disk is part of RAID disks). At block 507, the data is written back to the failed sector to trigger the remap process. Thereafter, a next sector is identified and selected at block 503, and the above operations are iteratively performed for all of the sectors in the disk.

According to some embodiments, one or more predictive models are created based on operating statistics of a large number of disks in the past. Particularly, the reallocated sector (RS) counts are collected from the disks of various storage systems to create one or more predictive models to calculate various probabilities of a target disk given certain parameters such as a reallocated sector count of the target disk. In one embodiment, the predictive models include a first model to calculate a first probability of a whole-disk failure for this specific disk model, for example, based on the past operating statistics of a large number of disks. The predictive models further include a second model to calculate a second probability that a failed disk has a reallocated sector count less than a given reallocated sector count. The predictive models further include a third model to calculate a third probability that a disk has a reallocated sector count less than a given reallocated sector count. Note that the third probability considers all disks, whether failed or functional, while the second probability considers only the failed disks. Thereafter, a probability of disk failure given the reallocated sector count of the target disk is determined based on the first, second, and third probabilities. In a RAID environment, the probabilities of individual disk failures given the respective reallocated sector counts can be determined using the above techniques. The probability of multiple ones of the RAID disks can then be determined based on the individual probabilities of disk failures.

In one embodiment, when a reallocated sector (henceforth referred to as RS) count of target disk is received, the RS count is fed into the models described above. Based on the received RS count of the target disk, a first model is configured to calculate a conditional probability of a failed disk given an RS count that is less than the RS count of the target disk, referred to herein as P(RS|fail). Based on the received RS count of the target disk, a second model is configured to calculate a probability of a disk (e.g., regardless whether the disk is a failed or working disk) that has an RS count that is less than the RS count of the target disk, referred to herein as P(RS). A third model is configured to calculate a probability of a disk that is a failed disk based on the previously examined large number of disks, referred to herein as P(fail). Thereafter, a probability of a disk that is a failed disk given the received RS count of the target disk, referred to herein as P(fail|RS), is calculated based on P(RS|fail), P(RS), and P(fail). In one embodiment, probability P(fail|RS) is calculated by multiplying P(RS|fail) with P(fail) and divided by P(RS) as follows:

$$P(\text{fail}|RS) = P(RS|\text{fail}) \times P(\text{fail})/P(RS) \qquad (1)$$

In a RAID configuration, P(fail|RS) represents a probability of a single RAID disk given a particular RS count. The probability of multiple disk failures can be derived from the P(fail|RS) of individual RAID disks. For example, the failure probability of at least two of the RAID disks given their respective RS counts can be calculated.

From the individual failure probabilities of individual disks, their corresponding probabilities of working disks can be derived as P(work)=1−P(fail). In a RAID configuration, it is assumed there are four disks in a target RAID group. The RAID group failure can be defined as two or more disk failures in this example (assuming the disk group has 4 disks):

$$P(\text{RAID group failure}) = P(\text{disk failure number} \geq 2)$$
$$= 1 - P(\text{disk\_failure\_num}=0) - P(\text{disk\_failure\_num}=1).$$

$$P(\text{disk\_failure\_num}=0) = P(\text{disk1\_w}) * P(\text{disk2\_w}) * P(\text{disk3\_w}) * P(\text{disk4\_w}).$$

$$P(\text{disk\_failure\_num}=1) = P(\text{disk1\_failure}) * P(\text{disk2\_w}) * P(\text{disk3\_w}) * P(\text{disk4\_w}) + P(\text{disk1\_w}) * P(\text{disk2\_failure}) * P(\text{disk3\_w}) * P(\text{disk4\_w}) + P(\text{disk1\_w}) * P(\text{disk2\_w}) * P(\text{disk3\_failure}) * P(\text{disk4\_w}) + P(\text{disk1\_w}) * P(\text{disk2\_w}) * P(\text{disk3\_w}) * P(\text{disk4\_failure}).$$

P(disk failure number=0) refers to the probability of no disk failure, given the specific RS counts of the target disks in the RAID group. P(disk failure number=1) refers to the probability of one disk failure, given the specific RS counts of the target disks in the RAID group. P(disk1_w), P(disk2_w), P(disk3_w), and P(disk4_w) refer to the probabilities of working disk for disk 1 to disk 4, respectively. P(disk1_failure), P(disk2_failure), P(disk3_failure), and P(disk4_failure) refer to the probabilities of disk failure for disk 1 to disk 4, given the specific RS counts of the target disks in the RAID group, respectively. Similarly, the probability of more than any number of disks can also be calculated. According to one embodiment, there are two tunable parameters: 1) the number of disk failures to be prevented, where the default number here is >=2; and 2) the number of disks in the RAID group (in this example, the number of disks is 4). Both numbers are adjustable based on different requirements and system settings.

According to one embodiment, the RS counts of the RAID disks can be obtained by performing a disk scrubbing process on all sectors of each of the RAID disks, including the live or in-used sectors and non-live or not-in-used sectors, which will accurately represent the vulnerability of the disk. In response to an error, such as a medium error, occurred during the disk scrubbing process, a remap process is triggered and the reallocated sector count of the disk is updated.

Figure 6:
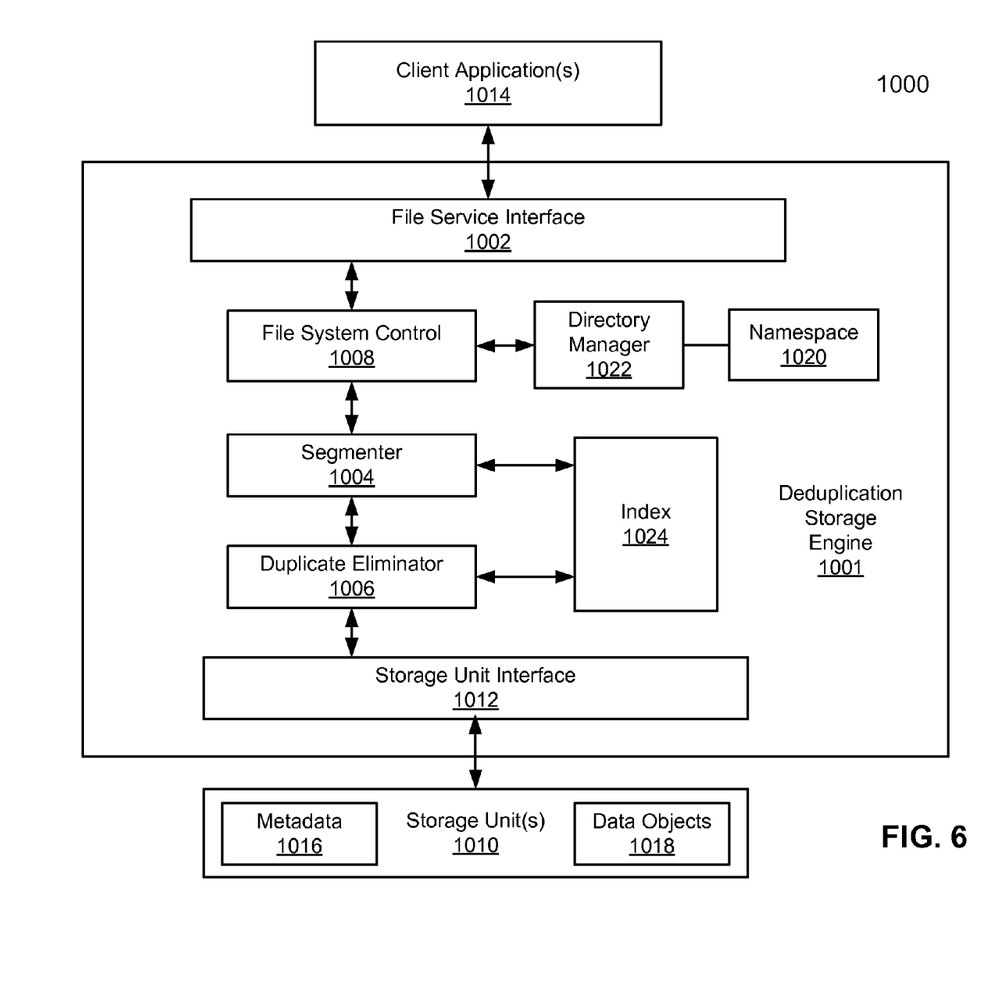
FIG. 6 is a block diagram illustrating a deduplicated storage system according to one embodiment of the invention.

FIG. 6 is a block diagram illustrating a deduplication storage system according to one embodiment of the invention. For example, deduplication storage system 1000 may be implemented as part of a deduplication storage system as described above, such as, for example, the deduplication engine 107 as shown in FIG. 1. In one embodiment, storage system 1000 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 1000 may have a distributed architecture, or all of its components may be integrated into a single unit. Storage system 1000 may be implemented as part of an archive and/or backup system such as a deduplicating storage system available from EMC® Corporation of Hopkinton, Mass.

In one embodiment, storage system 1000 includes a deduplication engine 1001 interfacing one or more clients 1014 with one or more storage units 1010 storing metadata 1016 and data objects 1018. Clients 1014 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1010 may be implemented locally (e.g., single node operating environment) or remotely (e.g., multi-node operating environment) via an interconnect, which may be a bus and/or a network (e.g., a storage network). In one embodiment, one of storage units 1010 operates as an active storage to receive and store external or fresh user data from a client (e.g., an end-user client or a primary storage system associated with one or more end-user clients), while the another one of storage units 1010 operates as a target storage unit to periodically archive data from the active storage unit according to an archiving policy or scheme. Storage units 1010 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1010 may also be combinations of such devices. In the case of disk storage media, the storage units 1010 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1016, may be stored in at least some of storage units 1010, such that files can be accessed independent of another storage unit. Metadata of each storage unit includes enough information to provide access to the files it contains. In one embodiment, metadata may include fingerprints contained within data objects 1018, where a data object may represent a data chunk, a compression region (CR) of one or more data chunks, or a container of one or more CRs. Fingerprints are mapped to a particular data object via metadata 1016, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 1016 may include a file name, a storage unit identifier (ID) identifying a storage unit in which the chunks associated with the file name are stored, reconstruction information for the file using the chunks, and any other appropriate metadata information. Metadata 1016 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk (also referred to as a data segment), one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1001 includes file service interface 1002, segmenter 1004 (also referred to as a chunking module or unit), duplicate eliminator 1006, file system control 1008, and storage unit interface 1012. Deduplication storage engine 1001 receives a file or files (or data item(s)) via file service interface 1002, which may be part of a file system namespace 1020 of a file system associated with the deduplication storage engine 1001. The file system namespace 1020 refers to the way files are identified and organized in the system. An example is to organize the files hierarchically into directories or folders, which may be managed by directory manager 1022. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based, such as, for example, a hash function is applied to values of data within a sliding window through the data stream or block and when the hash function is equal to a value (or equal to one of several values) then a chunk boundary is identified. In various embodiments, chunk boundaries are identified using content based functions operating on a sliding window within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, a chunk boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 1008, also referred to as a file system manager, processes information to indicate the chunk(s) association with a file. In some embodiments, a list of fingerprints is used to indicate chunk(s) associated with a file. File system control 1008 passes chunk association information (e.g., representative data such as a fingerprint) to index 1024. Index 1024 is used to locate stored chunks in storage units 1010 via storage unit interface 1012. Duplicate eliminator 1006, also referred to as a segment store, identifies whether a newly received chunk has already been stored in storage units 1010. In the event that a chunk has already been stored in storage unit(s), a reference to the previously stored chunk is stored, for example, in a chunk or segment tree associated with the file, instead of storing the newly received chunk. A chunk or segment tree of a file may include one or more nodes and each node represents or references one of the deduplicated chunks stored in storage units 1010 that make up the file. Chunks are then packed by a container manager (which may be implemented as part of storage unit interface 1012) into one or more storage containers stored in storage units 1010. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 1002 is configured to communicate with file system control 1008 to identify appropriate chunks stored in storage units 1010 via storage unit interface 1012. Storage unit interface 1012 may be implemented as part of a container manager. File system control 1008 communicates (e.g., via segmenter 1004) with index 1024 to locate appropriate chunks stored in storage units via storage unit interface 1012. Appropriate chunks are retrieved from the associated containers via the container manager and are used to construct the requested file. The file is provided via interface 1002 in response to the request. In one embodiment, file system control 1008 utilizes a tree (e.g., a chunk tree obtained from namespace 1020) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1001 may be implemented in software (e.g., executable code executed in a memory by a processor), hardware (e.g., processor(s)), or a combination thereof. For example, deduplication engine 1001 may be implemented in a form of executable instructions that can be stored in a machine-readable storage medium, where the instructions can be executed in a memory by a processor.

In one embodiment, storage system 1000 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
for each of a plurality of sectors of a first storage disk, iteratively performing:
issuing a read operation to a sector of the first storage disk of a storage system;
in response to an error returned from the read operation, determining whether the sector is a live sector;
generating first data as random data if the sector is not a live sector; and
writing the first data to the sector to trigger a remap process that remaps a logical block address associated with the sector to another physical block address, wherein the remap process is performed by internal logic of the first storage disk that causes a number of reallocated sectors to be incremented, and
wherein the number of reallocated sectors of the first storage disk is used to determine whether the first storage disk is vulnerable.

2. The method of claim 1, further comprising:
reconstructing data previously stored in the sector based on redundant data associated with the sector in response determining that the sector is a live sector; and
writing the reconstructed data to the sector to trigger the remap process.

3. The method of claim 2, wherein the first storage disk is one of a plurality of storage disks as part of a redundant array of independent disks (RAID).

4. The method of claim 3, wherein the reconstructed data is generated based on the redundant data stored from at least a portion of remaining RAID disks other than the first storage disk.

5. The method of claim 1, wherein the error is a medium error indicating that the sector is inaccessible, and wherein determining whether the sector is a live sector is performed only if the error is a medium error.

6. The method of claim 1, wherein determining whether the first storage disk is vulnerable comprises determining a probability of failure for the first storage disk using a predictive model in view of the number of reallocated sectors, and wherein the first storage disk is vulnerable if the probability is above a predetermined threshold.

7. The method of claim 1, wherein the remap process is to increment a reallocated sector count representing a number of remapped sectors due to the remap process, and wherein the reallocated sector count is obtained from a SMART attribute associated with the first storage disk.

8. A non-transitory machine-readable medium having instructions stored therein, which when executed by a processor, cause the processor to perform operations, the operations comprising:
for each of a plurality of sectors of a first storage disk, iteratively performing:
issuing a read operation to a sector of the first storage disk of a storage system,
in response to an error returned from the read operation, determining whether the sector is a live sector,
generating first data as random data if the sector is not a live sector; and
writing the first data to the sector to trigger a remap process that remaps a logical block address associated with the sector to another physical block address, wherein the remap process is performed by internal logic of the first storage disk that causes a number of reallocated sectors to be incremented, and
wherein the number of reallocated sectors of the first storage disk is used to determine whether the first storage disk is vulnerable.

9. The non-transitory machine-readable medium of claim 8, wherein the operations further comprise:
reconstructing data previously stored in the sector based on redundant data associated with the sector in response determining that the sector is a live sector; and
writing the reconstructed data to the sector to trigger the remap process.

10. The non-transitory machine-readable medium of claim 9, wherein the first storage disk is one of a plurality of storage disks as part of a redundant array of independent disks (RAID).

11. The non-transitory machine-readable medium of claim 10, wherein the reconstructed data is generated based on the redundant data stored from at least a portion of remaining RAID disks other than the first storage disk.

12. The non-transitory machine-readable medium of claim 8, wherein the error is a medium error indicating that the sector is inaccessible, and wherein determining whether the sector is a live sector is performed only if the error is a medium error.

13. The non-transitory machine-readable medium of claim 8, wherein determining whether the first storage disk is vulnerable comprises determining a probability of failure for the first storage disk using a predictive model in view of the number of reallocated sectors, and wherein the first storage disk is vulnerable if the probability is above a predetermined threshold.

14. The non-transitory machine-readable medium of claim 8, wherein the remap process is to increment a reallocated sector count representing a number of remapped sectors due to the remap process, and wherein the reallocated sector count is obtained from a SMART attribute associated with the first storage disk.

15. A data processing system, comprising:
a processor; and
a memory storing instructions, which when executed from the memory, cause the processor to perform operations, the operations including
for each of a plurality of sectors of a first storage disk, iteratively performing:
issuing a read operation to a sector of the first storage disk of a storage system,
in response to an error returned from the read operation, determining whether the sector is a live sector,
generating first data as random data if the sector is not a live sector; and
writing the first data to the sector to trigger a remap process that remaps a logical block address associated with the sector to another physical block address, wherein the remap process is performed by internal logic of the first storage disk that causes a number of reallocated sectors to be incremented, and
wherein the number of reallocated sectors of the first storage disk is used to determine whether the first storage disk is vulnerable.

16. The system of claim 15, wherein the operations further comprise:
reconstructing data previously stored in the sector based on redundant data associated with the sector in response determining that the sector is a live sector; and
writing the reconstructed data to the sector to trigger the remap process.

17. The system of claim 16, wherein the first storage disk is one of a plurality of storage disks as part of a redundant array of independent disks (RAID).

18. The system of claim 17, wherein the reconstructed data is generated based on the redundant data stored from at least a portion of remaining RAID disks other than the first storage disk.

19. The system of claim 15, wherein the error is a medium error indicating that the sector is inaccessible, and wherein determining whether the sector is a live sector is performed only if the error is a medium error.

20. The system of claim 15, wherein determining whether the first storage disk is vulnerable comprises determining a probability of failure for the first storage disk using a predictive model in view of the number of reallocated sectors, and wherein the first storage disk is vulnerable if the probability is above a predetermined threshold.

21. The system of claim 15, wherein the remap process is to increment a reallocated sector count representing a number of remapped sectors due to the remap process, and wherein the reallocated sector count is obtained from a SMART attribute associated with the first storage disk.

* * * * *